United States Patent
Niu

(10) Patent No.: US 9,636,643 B2
(45) Date of Patent: May 2, 2017

(54) POLYMERIC MATRICES FORMED FROM MONOMERS COMPRISING A PROTECTED AMINE GROUP

(71) Applicant: GENERAL ELECTRIC COMPANY, Schenectady, NY (US)

(72) Inventor: Qingshan Jason Niu, Excelsior, MN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/465,108

(22) Filed: Aug. 21, 2014

(65) Prior Publication Data

US 2014/0360932 A1 Dec. 11, 2014

Related U.S. Application Data

(62) Division of application No. 12/974,054, filed on Dec. 21, 2010, now Pat. No. 8,839,960.

(51) Int. Cl.
| | | |
|---|---|---|
| *C08G 69/42* | (2006.01) | |
| *B01D 71/60* | (2006.01) | |
| *B01D 67/00* | (2006.01) | |
| *B01D 69/12* | (2006.01) | |
| *B01D 71/56* | (2006.01) | |
| *B01D 61/08* | (2006.01) | |
| *C08G 69/26* | (2006.01) | |
| *C08G 69/32* | (2006.01) | |
| *B01D 61/02* | (2006.01) | |

(52) U.S. Cl.
CPC .............. *B01D 71/60* (2013.01); *B01D 61/08* (2013.01); *B01D 67/0006* (2013.01); *B01D 69/125* (2013.01); *B01D 71/56* (2013.01); *C08G 69/26* (2013.01); *C08G 69/32* (2013.01); *C08G 69/42* (2013.01); *B01D 61/025* (2013.01); *B01D 61/027* (2013.01); *B01D 2323/30* (2013.01); *C08G 2340/00* (2013.01)

(58) Field of Classification Search
CPC .................................. C08G 69/32; C08G 69/42
See application file for complete search history.

(56) References Cited

U.S. PATENT DOCUMENTS

| | | | |
|---|---|---|---|
| 4,761,234 A | 8/1988 | Uemura et al. | |
| 4,828,708 A | 5/1989 | Bray | |
| 5,321,162 A * | 6/1994 | Kim | 560/317 |
| 6,837,996 B2 | 1/2005 | Kurth et al. | |
| 2008/0296225 A1 * | 12/2008 | Ho | 210/640 |

FOREIGN PATENT DOCUMENTS

| | | |
|---|---|---|
| CN | 101254417 A | 9/2008 |
| GB | 1246168 A | 9/1971 |
| JP | 62121603 A | 6/1987 |
| JP | 62176506 A | 8/1987 |
| JP | 10165790 A | 6/1998 |
| JP | 2004050144 A | 2/2004 |
| JP | 2004255368 A | 9/2004 |
| JP | 2006198461 A | 8/2006 |

OTHER PUBLICATIONS

Tang et al., Probing the nano- and micro-scales of reverse osmosis membranes; J. Mem. Sci., 287 (2007), 146-156.
Jin et al., Effects of polymerization conditions on hydrophilic groups in aromatic polyaminde thin films; J. Membr. Sci 330 (2009) 175-179.
Nadler et al., Molecular simulation of polyamide synthesis by interfacial polymerization; J. Membr. Sci. 315 (2008) 100-105.
Cahill, et al., Microscopy and microanalysis of reverse-osmosis and nanofiltraion membranes; MRS Bulletin, 33 (2008), 27-32.
Kim et al., Positron annihilation spectroscopic evidence to demonstrate the flux-enhancement mechanism in morphology-controlled thin-film-composite (TFC) membrane; Environ. Sci. Technol., 39 (2005)1764-1770.
Freger, Viatcheslav, Nanoscale heterogeneity of polyamide membranes formed by interfacial polymerization, Langmuir 19 (2003) 4791-4797.
Kwolek et al., Synthesis, anisotropic solutions, and fibers of poly(1,4-benzamine), Macromolecules, 1977, 10 (6), 1390-1398.
Kim, Young H., Lyotropic liquid crystalline hyperbranched aromatic polyamides, J. Am. Chem. Soc., 1992, 114 (12), 4947-4948.
Search Report and Written Opinion from corresponding PCT Application No. PCT/US2011/058765 dated Jan. 30, 2012.
Huber, T. et al., "New Hyperbranched Poly(Ether Amide)s Via Nucleophilic Ring Opening of 2-Oxazoline-Containing Monomers", Macromolecular Chemistry and Physics, vol. 200, No. 1, pp. 126-133, Jan. 1, 1999.
Chiang, Y. C. et al., "Nanofiltration membranes synthesized from hyperbranched polyethyleneimine", Journal of Membrane Science, vol. 326, No. 1, pp. 19-26, Jan. 5, 2009.
Unofficial Manual Translation of Chinese Office Action issued in connection with corresponding CN Application No. 201180062008.5 on Sep. 19, 2014.
Thomas Huber et al. New Hyperbranched Poly(ether amide)s via Nucleophilic Ring Opening of 2—oxazoline—containing Monomers, Macromolecular Chemistry and Physics, 200, Dec. 13, 1991.
Yen-Che Chiang et al., Nanofiltration Membranes Synthesized from Hyperbranched Polyethyleneimine, Journal of Membrane Science, vol. 326, Issue 1, Jan. 5, 2009, pp. 19-26.
Unofficial English translation of Japanese Office Action issued in connection with corresponding JP Application No. 2014521607 on Nov. 17, 2015.
Toyobo Co Ltd et al., English language abstract of JP62176506, published Aug. 3, 1987.

(Continued)

*Primary Examiner* — Gregory Listvoyb

(57) ABSTRACT

The present disclosure relates to polymeric matrices composed of protected amine compound residues and membranes composed from such polymeric matrices. In particular, the present disclosure relates to a polymeric matrix comprising amine compound residues, acyl compound residues and protected amine compound residues.

29 Claims, 1 Drawing Sheet

(56) References Cited

OTHER PUBLICATIONS

Nitto Denko Corp, English language abstract of JP10165790, published Jun. 23, 1998.
Toray Industries, English language abstract of JP2004050144, published Feb. 19, 2004.
Toray Industries, English language abstract of JP2004255368, published Sep. 16, 2004.
Toray Industries, English language abstract of JP2006198461, published Aug. 3, 2006.

* cited by examiner

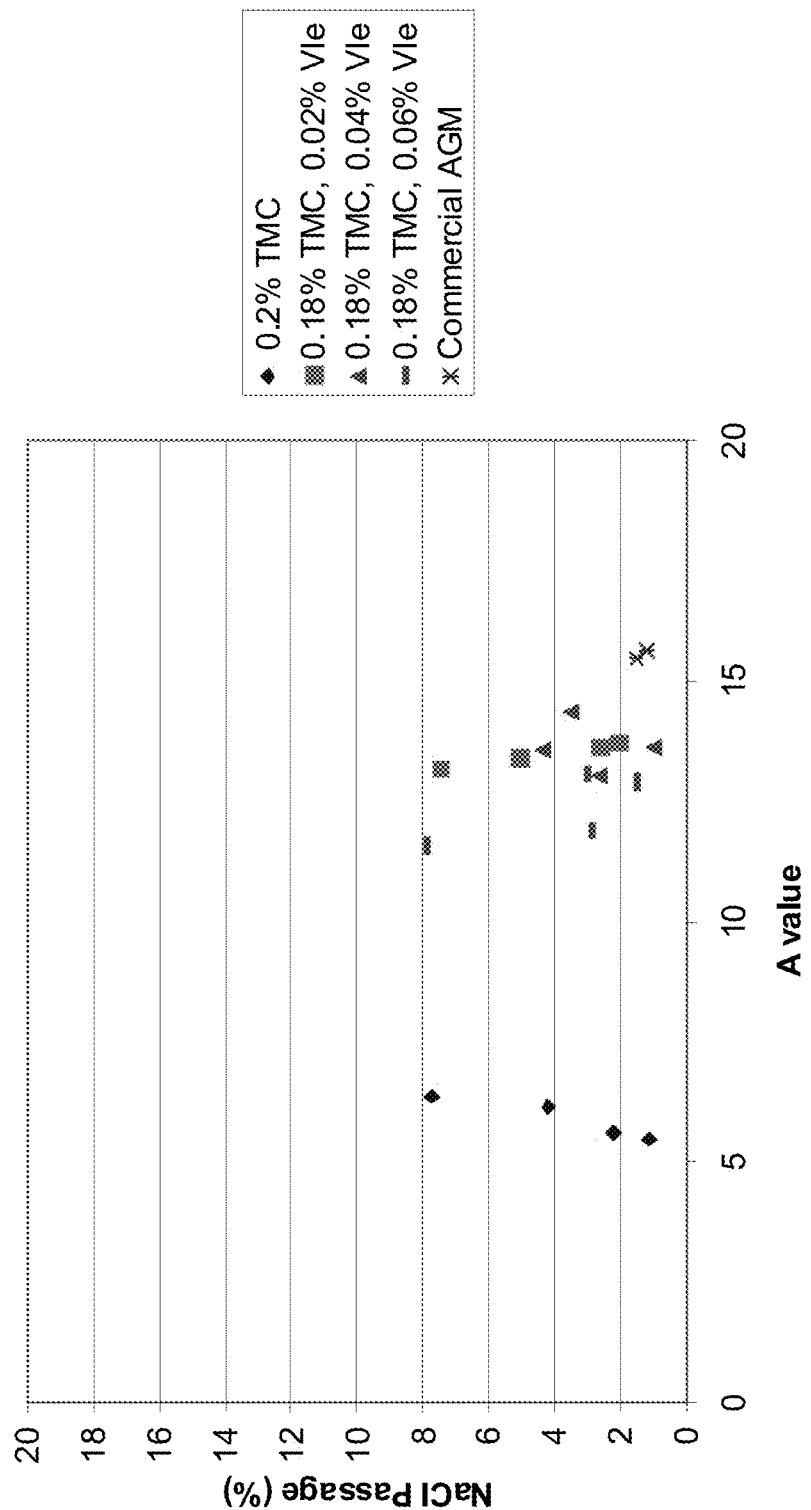

US 9,636,643 B2

POLYMERIC MATRICES FORMED FROM MONOMERS COMPRISING A PROTECTED AMINE GROUP

CROSS REFERENCE TO RELATED APPLICATIONS

This is a divisional application of U.S. application Ser. No. 12/974,054, filed Dec. 21, 2010. U.S. application Ser. No. 12/974,054 is hereby incorporated by reference.

FIELD

The present disclosure relates to polymeric matrices composed of protected amine compound residues and membranes made from such polymeric matrices.

BACKGROUND

Membranes for use in reverse osmosis or nano-filtration are generally fabricated by interfacial polymerization of a monomer in a non-polar (e.g. organic) phase together with a monomer in a polar (e.g. aqueous) phase on a porous support membrane and are used, for example, in the purification of water. Such membranes are subject to fouling resulting in reduced flux as contaminants, for example from the water to be purified, build up on the surface of the membrane.

The general strategy for improving membrane performance has focused on i) addition of non-reactive solvent additives in organic or aqueous phases during interfacial polymerization, ii) post rinsing and treatment of the as made membrane after fabrication of barrier layer, and iii) addition of swelling agents after rinsing and prior to drying of the polymer membrane.

Various characterizations of membranes show that the structure of the polyamide barrier layer in thin-film composite (TFC) membranes is important to its performance and application. The polyamide layer of many TFC-membranes fabricated by interfacial polymerization of monomer units shows ridge-and-valley surface morphology and two distinct loose domains (carboxyl-rich and carboxyl-free) separated by a thin dense interlayer. Because the carboxyl-rich domain is on the top of the membrane, it introduces a negative charge on the membrane surface during normal operation conditions, which is a major factor that contributes to membrane fouling and flux decrease during operation.

SUMMARY

The present disclosure relates to a polymeric matrix, useful in membrane technology, such as in reverse osmosis or nano-filtration membranes, which has a reduced amount of negative charge on the top surface of the membrane, and therefore, has a lower potential for membrane fouling. The incorporation of hyperbranched polyamide structures into the polymeric matrix via the interfacial polymerization process using a monomer unit comprising a protected amino group in the organic phase, results in a decrease in the amount of free carboxyl groups that form on the top surface of the matrix during the polymerization of a polyamine and an amine reactive polyacyl compound. In addition, the incorporation of monomer additives comprising a protected amino group into the polyamide polymeric matrix results in the in situ formation of nano-sized structures. When the polymeric matrix is supported by a substrate to form a membrane (for example, a RO or NF membrane), the in situ formed nano-structures increase the flux (A value) of the membranes.

Accordingly, the present disclosure relates to a polymeric matrix, wherein the matrix is composed of:

(i) amine compound residues having at least two amine moieties;

(ii) acyl compound residues having at least two acyl moieties; and (iii) protected amine compound residues having (a) at least two amine moieties, or (b) at least one amine moiety and at least one acyl moiety.

In another embodiment, at least a portion of the protected amine compound residues comprising at least one amine moiety and at least one acyl moiety comprise a self-polymerized polymer In another embodiment, the polymeric matrix further comprises a substrate to form a membrane, and the membrane possesses an A value of least about 5.0.

The present disclosure relates to a polymeric matrix comprising a polyamide polymer, wherein the polymer is formed from:

(i) polyamine monomers;

(ii) amine reactive polyacyl monomers; and (iii) monomers comprising a protected amino group.

The disclosure also relates to a polymeric reaction product formed from interfacial polymerization of:

(i) polyamine monomers;

(ii) amine reactive polyacyl monomers; and (iii) monomers comprising a protected amino group.

The present disclosure also includes a process for preparing membranes comprising a polymeric matrix of the disclosure which reduce the surface negative charge of the membrane. Accordingly, in one embodiment, included in the disclosure is an interfacial polymerization process to prepare a membrane, comprising:

contacting a substrate with:

an aqueous solution comprising (i) polyamine monomers; and an organic solution comprising (i) amine reactive polyacyl monomers; and (ii) monomers comprising a protected amino group.

The membranes comprising the polymeric matrices of the present disclosure are useful as reverse osmosis or nano-filtration membranes for the treatment of water, for example seawater, brackish water, or wastewater, to reduce the concentration of solutes (such as salt) in the water.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

Embodiments of the disclosure will be described in relation to the drawings in which:

The FIGURE is a graph illustrating the passage of sodium chloride through a membrane vs. the A value of a membrane representing an embodiment of the disclosure using monomers comprising a protected amino group.

DETAILED DESCRIPTION

(I) Definitions

Unless otherwise indicated, the definitions and embodiments described in this and other sections are intended to be applicable to all embodiments and aspects of the application herein described for which they are suitable as would be understood by a person skilled in the art.

The terms "a," "an," or "the" as used herein not only include aspects with one member, but also includes aspects with more than one member.

In embodiments comprising an "additional" or "second" component, the second component as used herein is chemically different from the other components or first component. A "third" component is different from the other, first, and second components, and further enumerated or "additional" components are similarly different.

The term "matrix" means a regular, irregular and/or random arrangement of polymer molecules. The molecules may or may not be crosslinked. On a scale such as would be obtained from SEM, x-ray or FTNMR, the molecular arrangement may show a physical configuration in three dimensions like those of networks, meshes, arrays, frameworks, scaffoldings, three dimensional nets or three dimensional entanglements of molecules. The matrix is usually non-self supporting and most often is constructed as a coating or layer on a support material.

The term "acyl" and "acyl moiety" refers to the functional group "C(O)", also represented by the formula:

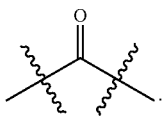 [SMILES: *C(*)=O]

The term "amine" and "amine moiety" refers to a functional grouping containing a basic nitrogen atom with a lone pair of electrons. Amines are derivatives of ammonia ($NH_3$) where one or more of the hydrogen atoms have been replaced with an alkyl or aryl group. Primary amines have the structure R'—$NH_2$, secondary amines have the structure R'R"NH and tertiary amines have the structure R'R"R'''N, wherein R', R" and R''' are an alkyl or aryl group.

The term "amide" refers to a chemical moiety of the formula:

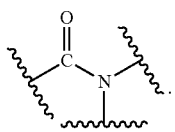 [SMILES: *C(=O)N(*)*]

The term "residues" as used herein refers to a chemical grouping formed by the polymerization of a monomer. For example, an amine compound residue refers to the chemical grouping formed when an amine monomer is polymerized, an acyl compound residue refers to the chemical grouping formed when an polyacyl monomer is polymerized and a protected amine compound residue refers to the chemical grouping formed when a protected amine monomer is polymerized.

The term "protected amino group" as used herein refers to a functional group, which upon contact with water or acid forms a primary or secondary amino group. The monomer units containing protected amino groups are soluble in organic solvents, such as toluene, xylene, hydrocarbons etc. For example, in one embodiment, a protected amino group comprises the moiety —N=S=O, and upon contact with water or acid solution forms an amino group (—$NH_2$). This process is also known as a deprotection step. Accordingly, the reaction proceeds as shown in Scheme 1.

Scheme 1

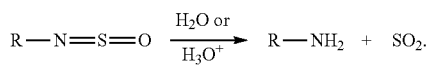

In one embodiment, a protected amino group is therefore any moiety which upon contact with water or acidic solution forms a free amino group, which is then able to further react in the polymerization process to prepare the polymeric matrices of the present disclosure. In one embodiment, the monomer units comprising a protected amino group also comprise at least one amine reactive acyl moiety, which results in such monomer units being able to self-polymerize and form separate polyamide polymers within the broader polymeric matrix, and which form nano-structures and increase the A value of the polymeric matrix when used as a membrane.

The term "$C_{a-b}$-(alkylene)" as used herein means straight and/or branched chain, saturated alkylene radicals containing from "a" to "b" carbon atoms in which one or more of the carbon atoms is optionally replaced by a heteromoiety selected from O, S, NH and $NC_{1-6}$alkyl, and includes (depending on the identity of "a" and "b") methylene, ethylene, propylene, isopropylene, n-butylene, s-butylene, isobutylene, t-butylene, 2,2-dimethylbutylene, n-pentylene, 2-methylpentylene, 3-methylpentylene, 4-methylpentylene, n-hexylene and the like, where the variable "a" is an integer representing the lowest number of carbon atoms and the variable "b" is an integer representing the largest number of carbon atoms in the alkylene radical.

The term "$C_{a-b}$-(alkenylene)" as used herein means straight and/or branched chain, saturated alkenylene radicals containing from "a" to "b" carbon atoms and at least one double bond (for example, 1, 2, 3 or 4 double bonds), in which one or more of the carbon atoms is optionally replaced by a heteromoiety selected from O, S, NH and $NC_{1-6}$alkyl, and includes (depending on the identity of "a" and "b") ethenylene, propenylene, isopropenylene, n-butenylene, s-butenylene, isobutenylene, t-butenylene, 2,2-dimethylbutenylene, n-pentenylene, 2-methylpentenylene, 3-methylpentenylene, 4-methylpentenylene, n-hexenylene and the like, where the variable "a" is an integer representing the lowest number of carbon atoms and the variable "b" is an integer representing the largest number of carbon atoms in the alkenmylene radical.

The term "$C_{1-6}$-(alkyl)" as used herein means straight and/or branched chain, saturated alkyl radicals and includes methyl, ethyl, propyl, isopropylene, n-butyl, s-butyl, isobutyl, t-butyl, 2,2-dimethylbutyl, n-pentyl, 2-methylpentyl, 3-methylpentyl, 4-methylpentyl, n-hexyl and the like.

The term "$C_{2-6}$-(alkenyl)" as used herein means straight and/or branched chain, unsaturated alkyl radicals containing one or more (for example, 1, 2 or 3) double bonds and includes ethenyl, propenyl, isopropenyl, n-butenyl, s-butenyl, isobutenyl, t-butenyl, 2,2-dimethylbutenyl, n-pentenyl, 2-methylpentenyl, 3-methylpentenyl, 4-methylpentenyl, n-hexenyl and the like.

The term "aliphatic" or "aliphatic group" is known in the art and includes branched or unbranched carbon chains which are fully saturated (alkyl) or which comprise one or more (e.g. 1, 2, 3, or 4) double (alkenyl) in the chain.

The term "cycloaliphatic" or "cycloaliphatic group" is known in the art and includes mono-cyclic and poly-cyclic hydrocarbons which are fully saturated (cycloalkyl) or which comprise one or more (e.g. 1, 2, 3, or 4) double bonds (cycloalkenyl) in the ring(s).

The term "aryl" as used herein refers to an aromatic, carbocyclic system, e.g., of 6 to 14 carbon atoms, which can include a single ring or multiple aromatic rings fused or linked together where at least one part of the fused or linked rings forms the conjugated aromatic system. The aryl groups include, but are not limited to, phenyl, naphthyl, biphenyl, anthryl, tetrahydronaphthyl, phenanthryl, indene, benzonaphthyl, and fluorenyl.

The term "polyamine monomer" as used herein refers to any monomer containing at least two nucleophilic primary or secondary amino groups, which are able to react with the amine reactive polyacyl monomer units to form a polyamide polymer, and which are soluble in an aqueous solution. Examples of polyamine monomers include, but are not limited to, aromatic, aliphatic and/or cycloaliphatic (or compounds containing both aromatic, aliphatic and cycloaliphatic moieties) polyamine monomers. It will be understood by those skilled in the art that polyamine monomer units refer to the compounds used to prepare the polymer, while the term "amine compound residues" refers to the compounds that have been polymerized, and which are therefore residues within the polymeric matrix.

The terms "aliphatic polyamine monomer", "cycloaliphatic polyamine monomer" or "aromatic polyamine monomer" as used herein refer to an aliphatic, cycloaliphatic or aromatic monomer containing at least two nucleophilic primary or secondary amino groups, which amino groups each react with amine reactive polyacyl monomers to form a polyamide polymer, and which are soluble in an aqueous solution. It will be understood by those skilled in the art that the aliphatic or aromatic polyamine monomer units refer to the compounds used to prepare the polymer, while the term "amine compound residues" refers to the compounds that have already been polymerized, and which are therefore residues within the polymeric matrix.

The term "amine reactive polyacyl monomer" as used herein refers to a compound containing at least two reactive (electrophilic) acyl moieties of the formula:

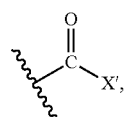

wherein X' is a leaving group and which are therefore able to react with nucleophilic amine moieties to form a polyamide polymer. Examples of leaving groups (X') include halogens (chloride, fluoride, bromide and iodide), anhydrides, activated esters, and other leaving groups such as tosylates, mesylates, triflates etc.

The terms "halogen", "halide" or "halo" as used herein include chloro, fluoro, bromo or iodo.

The structure

within the chemical structures as used herein refers to the repeating subunits of the polymeric matrices of the disclosure, and accordingly, further repeating monomer subunits would continue after the structure.

The term "A value" as used herein refers to the permeate flux capacity RO water permeability of a membrane and is represented by the cubic centimeters of permeate water over the square centimeters of membrane area times the seconds at the pressure measured in atmospheres.

The term "permeation" or "permeate" means transmission of a material through a membrane.

The term "membrane" when used in the context of a reverse osmosis membrane or nano-filtration membrane as used herein refers to a selective barrier which is used to separate dissolved components of a feed fluid into a permeate (for example, water) that passes through the membrane and a retentate (for examples, salts) that is rejected or retained by the membrane. It will be understood that polymeric matrices of the present disclosure are supported by a substrate to form the membrane, and the polymeric matrices separate the dissolved components. The substrate is not involved in the separation of the dissolved components.

The term "self-polymerized polymer" as used herein refers to a polymer in which the monomeric units are able to polymerize with themselves to form a first polymeric substructure, wherein the first polymeric substructure is then incorporated into the broader polymer matrix (a polymeric substructure within, or polymerized to, the broader polymeric matrix). The term "substrate" means any substrate or support material onto which the matrix can be applied. The substrate may be porous or non-porous.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having", "containing" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

(II) Matrices and Membranes

The present disclosure relates to a polymeric matrix, useful in a membrane (such as a reverse osmosis membrane or nano-filtration membrane) which has a reduced amount of negative charge on its top surface. Therefore, a membrane of the disclosure has a lower potential for membrane fouling. The incorporation of monomeric units which comprise a protected amino group in the organic phase during an interfacial polymerization process between a polyamine monomer and an amine reactive polyacyl monomer, results in a decrease in the amount of free carboxyl groups that form on the top surface of a membrane comprising the matrix. The matrices of the disclosure also possess balanced surface functionality, as well as less nanoscale heterogeneity. In addition, the polymeric matrices of the disclosure are highly crosslinked due to the presence of monomers which comprise a protected amino group during the polymerization process, which results in membranes having a higher stability both to pH and free chlorine. Finally, the membranes comprising polymeric matrices of the disclosure have higher A values due to in situ formed nano-structures which form as a result of the self-polymerization of the monomer units comprising protected amine monomers.

Accordingly, the present disclosure relates to a polymeric matrix, wherein the matrix is composed of:
(i) amine compound residues having at least two amine moieties;
(ii) acyl compound residues having at least two acyl moieties; and
(iii) protected amine compound residues having
    (a) at least two amine moieties, or
    (b) at least one amine moiety and at least one acyl moiety.

In another embodiment, when the protected amine compound residues contain at least one amine moiety and at least one acyl moiety, at least a portion of the residues are formed from self-polymerization. In one embodiment, the monomers comprising a protected amino group which comprise at least one amine reactive acyl moiety and at least one protected amino moiety are able to self-polymerize once the amino group has been deprotected in the presence of water or acid. In one embodiment, these monomers are then able to self-polymerize into polymeric substructures (nano-sized structures which in one, embodiment, increase the flux of a membrane containing such structures), which are subsequently incorporated into the broader polymeric matrix (formed from polyamine monomers and amine reactive polyacyl monomers, and/or the monomers comprising a protected amino group) during, for example, an interfacial polymerization process.

In another embodiment, the polymeric matrix further comprises a substrate to form a membrane, and the membrane possesses an A value greater than zero, optionally at least about 5.0.

In another embodiment, the protected amino compound residue is a residue of the formula (I):

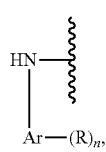

(I)

wherein

Ar is an optionally substituted aryl group containing 6-14 carbon atoms;

R is independently or simultaneously

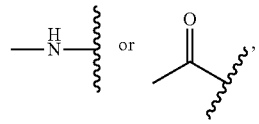

and n is 1, 2 or 3, wherein the optional substituents comprise from one to five of halo, $(C_1$-$C_6)$-alkyl, $(C_1$-$C_6)$-alkenyl, or $(C_1$-$C_6)$-alkynyl.

In another embodiment, Ar is an optionally substituted aryl group containing 6-10 carbon atoms, for example phenyl or naphthyl. In another embodiment, Ar is an optionally substituted $C_6$-aryl group, for example, phenyl. In another embodiment, the optional substituents comprise methyl, ethyl, propyl or iso-propyl.

In another embodiment, the residues of the formula (I) are residues of the formula (Ia), (Ib) or (Ic):

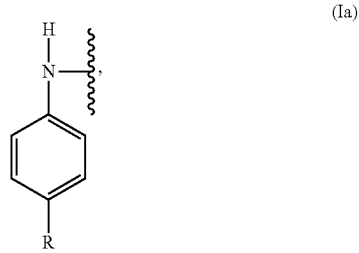

(Ia)

(Ib)

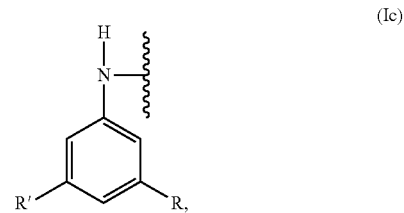

(Ic)

wherein R is

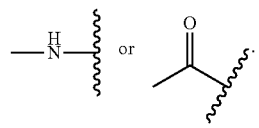

In one embodiment, the residue of the formula (Ia) is:

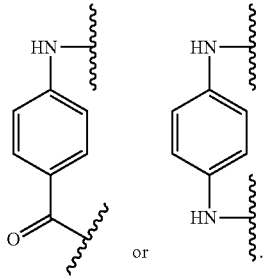 [SMILES: *Nc1ccc(C(*)=O)cc1 ; *Nc1ccc(N*)cc1]

In another embodiment, the residue of the formula (Ib) is:

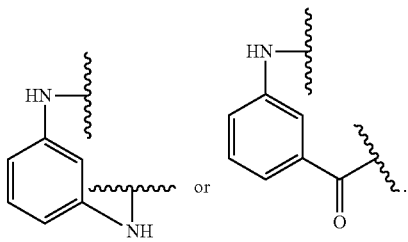 [SMILES: *Nc1cccc(N*)c1 ; *Nc1cccc(C(*)=O)c1]

In another embodiment, the residue of the formula (Ic) is:

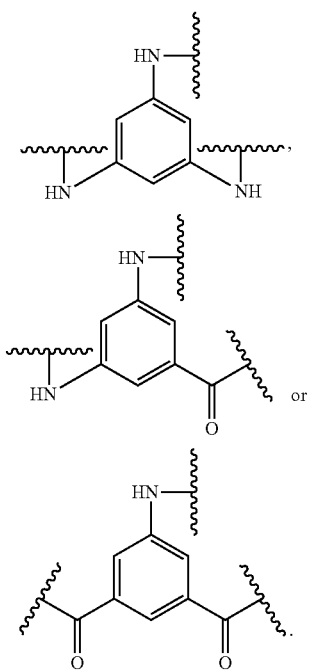

In another embodiment, the amine compound residues comprises at least two amino (—NH) moieties. In an embodiment, the amine compound residues comprise an aliphatic amine compound residue, an aromatic amine compound residue or a cycloaliphatic amine compound residue. In a further embodiment, the aromatic amine compound residue comprises a residue of the formula (II):

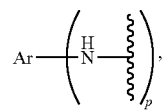

(II)

wherein Ar is an optionally substituted aryl group containing 6-14 carbon atoms; and p is 2 or 3, wherein the optional substituents comprise from one to five of halo, $(C_1$-$C_6)$-alkyl, $(C_1$-$C_6)$-alkenyl, or $(C_1$-$C_6)$-alkynyl.

In another embodiment, Ar is an optionally substituted aryl group containing 6-10 carbon atoms, for example phenyl or naphthyl. In another embodiment, Ar is an optionally substituted $C_6$-aryl group, for example, phenyl. In another embodiment, the optional substituents comprise methyl, ethyl, propyl or iso-propyl.

In another embodiment, the aromatic polyamine residue of the formula (II) is

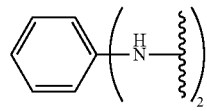

In another embodiment, the aromatic polyamine residue of formula (II) is:

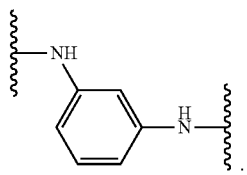 [SMILES: *Nc1cccc(N*)c1 ; "."]

In another embodiment of the disclosure, the cycloaliphatic amine compound residue is a residue of the formula (III):

(III)

wherein q is 0, 1, 2, 3 or 4, and wherein at least two of the carbon atoms are replaced by N atoms that participate in bonding with the polymer matrix.

In another embodiment, the cycloaliphatic amine compound residue is a $C_5$-$C_7$-cycloaliphatic, wherein at least two of the carbon atoms are replaced by N atoms that participate in bonding with the polymer matrix. In another embodiment, the cycloaliphatic amine compound residue is a $C_6$-cycloaliphatic, wherein at least two of the carbon atoms are replaced by N atoms that participate in bonding with the polymer matrix.

In another embodiment, the cycloaliphatic amine compound residue of formula III is:

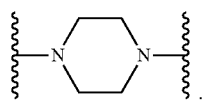

In one embodiment of the disclosure, the aliphatic amine compound residues are derived from monomers comprising at least two free amino (—NH$_2$) moieties. In another embodiment, the aliphatic amine compound residue is a residue of the formula (IV):

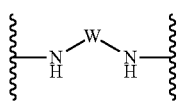

(IV)

wherein W is a (C$_{2-20}$)-alkylene group or a (C$_{2-20}$)-alkenylene group, and wherein at least one carbon atom, optionally at least two carbon atoms, in the alkylene or alkenylene group is optionally replaced by O, S, NH or N(C$_{1-6}$)alkyl moieties, suitably NH or N(C$_{1-6}$)alkyl moieties. In another embodiment, W is a (C$_{4-10}$)-alkylene group wherein at least one carbon atom, optionally at least two carbon atoms, in the alkylene group is optionally replaced by NH or N(C$_{1-6}$)alkyl moieties. In another embodiment of the disclosure, the aliphatic amine compound residue of the formula (IV) is:

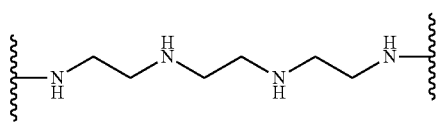

In another embodiment, the acyl compound residue is a residue of the formula (V):

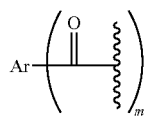

(V)

wherein Ar is an optionally substituted aryl group containing 6-14 carbon atoms; and m is 2, 3 or 4, wherein the optional substituents comprise from one to five of halo, (C$_1$-C$_6$)-alkyl, (C$_1$-C$_6$)-alkenyl, or (C$_1$-C$_6$)-alkynyl.

In another embodiment, Ar is an optionally substituted aryl group containing 6-10 carbon atoms, for example phenyl or naphthyl. In another embodiment, Ar is an optionally substituted C$_6$-aryl group, for example, phenyl. In another embodiment, the optional substituents comprise methyl, ethyl, propyl or iso-propyl.

In an embodiment, the acyl compound residue of formula (V) is:

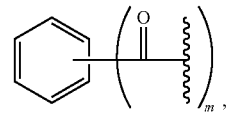

wherein m is 2 or 3.

In an embodiment, the acyl compound residue of formula (V) is:

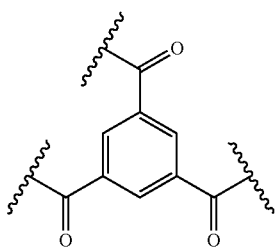

The present disclosure relates to a polymeric matrix comprising a polyamide polymer, wherein the matrix is formed from:
(i) polyamine monomers;
(ii) amine reactive polyacyl monomers; and
(iii) monomers comprising a protected amino group.

The disclosure also includes a polymeric reaction product formed from interfacial polymerization of:
(i) polyamine monomers;
(ii) amine reactive polyacyl monomers; and
(iii) monomers comprising a protected amino group.

In another embodiment of the disclosure, the monomer comprising a protected amino group is a compound of the formula (VI):

(VI)

wherein
Ar is an optionally substituted aryl group containing 6-14 carbon atoms;
Y is a protected amino group;
R is independently or simultaneously Y or —C(O)—X;
X is a leaving group; and
n is 1, 2 or 3,
wherein the optional substituents comprise from one to five of halo, (C$_1$-C$_6$)-alkyl, (C$_1$-C$_6$)-alkenyl, or (C$_1$-C$_6$)-alkynyl.

In another embodiment, Ar is an optionally substituted aryl group containing 6-10 carbon atoms, for example phenyl or naphthyl. In another embodiment, Ar is an optionally substituted C$_6$-aryl group, for example, phenyl. In another embodiment, the optional substituents comprise methyl, ethyl, propyl or iso-propyl.

In another embodiment, the protected amino group (Y) is —N=S=O.

In another embodiment of the disclosure, the compound of the formula (VI) is a compound of the formula (VIa), (VIb) or (VIc):

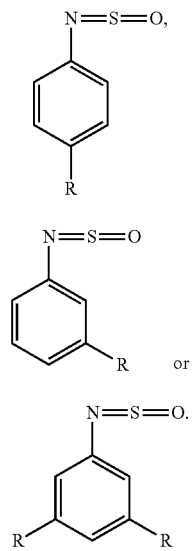

(VIa)

(VIb)

(VIc)

In an embodiment, the compound of formula (VIa) is:

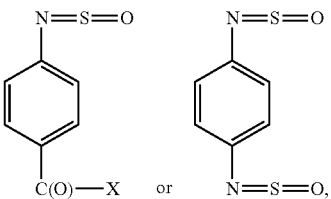

wherein X is a leaving group.

In another embodiment of the disclosure, the compound of the formula (VIb) is:

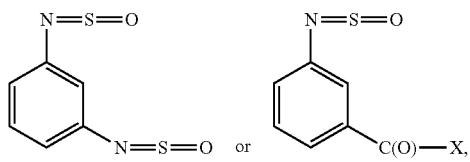

wherein X is a leaving group.

In another embodiment, the compound of the formula (VIc) is:

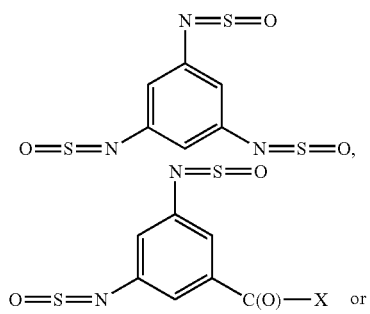

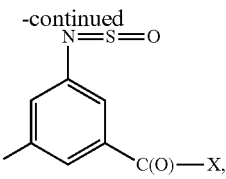

wherein X is a leaving group.

In another embodiment of the disclosure, when one of the groups R in the compounds of the formula (VI) is a —C(O)—X moiety, the compounds possess dual functionality, and therefore contain a protected amino group and an amine reactive acyl moiety. Accordingly, in one embodiment, such dual functional monomers are able to act as amine and acyl monomers during the preparation of the polyamide polymers and are therefore able to react in a self-polymerization process upon contact with, for example, water or acid solution. Once the protected amino group has been converted (deprotected) to a free amino group, it is able to react with the amine reactive acyl moiety (—C(O)—X) of another compound of the formula (VI). In one embodiment, such a self-polymerization process results in the in situ formation of nano-sized structures (a first polymeric substructure) within the broader polyamide polymeric matrix (formed from polyamine monomers, amine reactive polyacyl monomers and/or monomers comprising protected amino groups). In one embodiment, when the polymeric matrices of the present disclosure are supported on substrate to form a membrane (RO or NF), the nano-sized structures formed as a result of a self-polymerization process result in increased flux values, allowing more flow of the liquid through the membrane. In one embodiment, such nano-sized structures, increase the flux of a membrane, but do not affect the salt selectivity of the membrane.

In one embodiment, the monomers comprising the protected amino groups result in polymeric matrices having more balanced surface charges after the interfacial polymerization (IP) process. During an IP process, water molecules from the aqueous solution containing the polyamine monomer units diffuses into the organic solution containing the amine reactive polyacyl monomer units. As water is also nucleophilic, the water molecules also react with the amine reactive acyl moieties forming carboxylic acid groups on the top surface of the polymeric matrices. Without being bound by theory, it is thought that the addition of monomer units comprising protected amino groups reduces the number of carboxylic acid groups which form as a result of the deprotection of the protected amino moiety, such amino groups then reacting with the amine reactive acyl moieties (rather than water). The protected amino moiety also reacts with water molecules forming a free amino group in the organic solution, which then is able to react with amine reactive acyl moieties, and subsequently reducing the number of carboxylic acid groups which form during the IP process.

In another embodiment, the incorporation of monomers comprising protected amino groups increases the crosslinking of the polyamide polymer that is prepared using the above described monomers. In another embodiment, dual functional monomers comprising protected amino groups and amine reactive acyl moieties are able to react with other such dual functional monomers (self-polymerization) to form a precursor polyamide polymer (a polymeric substructure), which is then polymerized with the polyamine/polyacyl monomers. For example, as shown in Scheme 2, in one embodiment, when the monomers comprising protected amino groups are dual functional monomers (compounds of the formula (VId) and VIe)), the monomers react with themselves to form a polymeric substructure (forming VII and VIII) (self-polymerization process), which is then incorporated into the broader polyamide polymer.

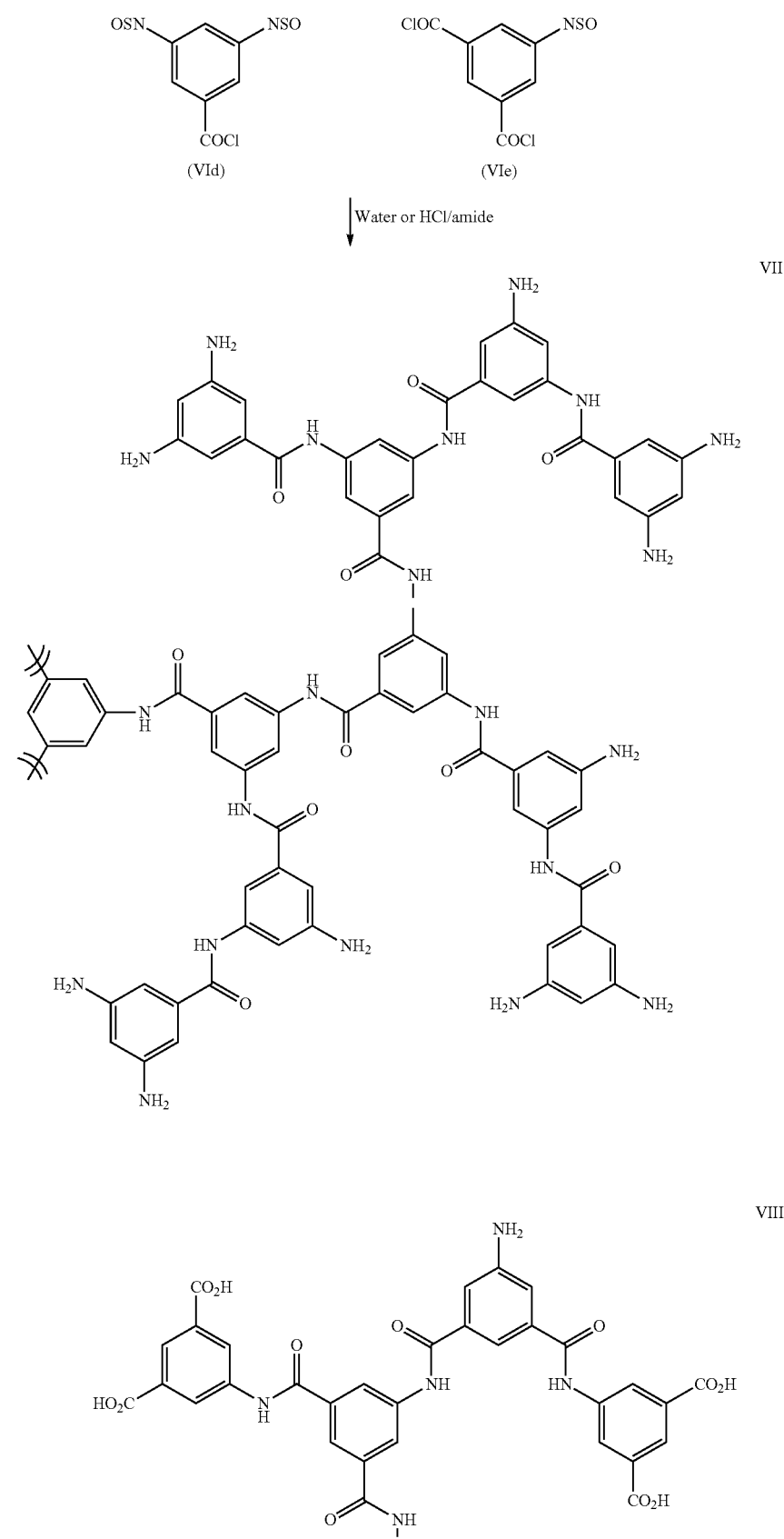

-continued

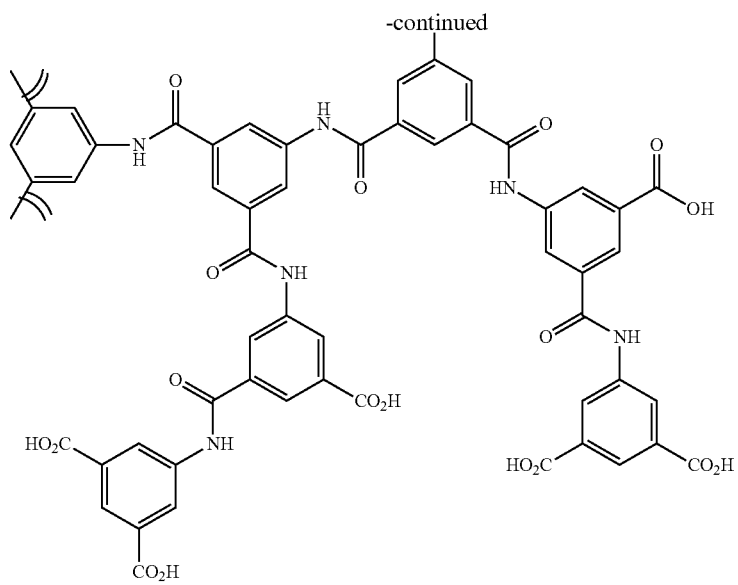

Accordingly, such monomer units comprising protected amino groups form nano/hyperbranched structures in situ, and therefore increase the porosity of the resulting membranes and the corresponding A value of the membrane. In addition, the monomers also slow the polymerization kinetics of the polyamide polymeric matrix formed from polyamine monomers and amine reactive polyacyl monomers.

In another embodiment of the disclosure, the monomers comprising protected amino groups are prepared by the halogenation of unprotected precursors (for example, an amino benzoacid), using a halogenating agent, such as thionyl chloride or oxalyl chloride and the like. In one embodiment, the preparation of a monomer unit comprising a protected amino group is shown in Scheme 3. Other general reactions to form monomers comprising a protected amino group is taught in U.S. Pat. No. 5,321,162 to Kim, which is herein incorporated by reference in its entirety. It will be understood that the halogenations of such precursor compounds is only one example of the preparation of such compounds, and the incorporation of any leaving group into such precursor compounds would be within the skill of those skilled in the art.

Scheme 3

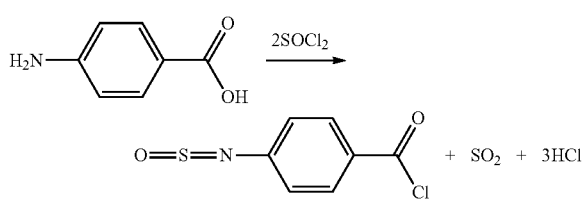

In an embodiment, when the polymeric matrices of the disclosure are supported on substrates and used as membranes (e.g. RO or NF membranes), the membranes possess an A value which is suitable for the treatment of seawater and/or brackish water desalination applications under current pressure limitations. In one embodiment, the A value is greater than 0. In one embodiment, the A value is at least about 5.0, about 5.5 or about 6.0. In another embodiment, as shown in the Figure, the polymers of the disclosure increase the A value of the membranes by at least two times (2×) (as compared to membranes which do not contain the monomer units comprising protected amino groups). While not wishing to be limited by theory, this effect may be a result of the hyperbranched nanosized structures which increase (or introduce) the porosity of the resulting polymeric matrix, and accordingly, correspondingly increase the A value.

In another embodiment, the polyamine monomer comprises at least two reactive amino moieties. In an embodiment, the polyamine monomer comprises an aliphatic polyamine, cycloaliphatic polyamine or aromatic polyamine. In one embodiment, the aliphatic portion of the aliphatic polyamine monomer is a branched or unbranched, saturated or unsaturated alkyl chain, containing between 2 and 20 carbon atoms contains at least two primary amino groups. Examples of such monomer units include, but are not limited to, triethylenetetraamine, ethylenediamine, propyelendiamine, or tris(2-aminoethyl)amine. Examples of aromatic polyamine monomers include, but are not limited to, diaminobenzene, m-phenylenediamine, p-phenylenediamine, triaminobenzene, 1,3,5-triaminobenzene, 1,3,4-triaminobenzene, 2,4-diaminotoluene, xylylene-diamine and the like. Examples of cycloaliphatic polyamine monomers include, but are not limited to, piperazine, imidazolidine, diazepane and isomers and the like.

In a further embodiment, the aromatic polyamine comprises a compound of the formula (IX):

(IX)

wherein Ar is an aryl group containing 6-14 carbon atoms; and p is 2 or 3, wherein the optional substituents comprise from one to five of halo, $(C_1-C_6)$-alkyl, $(C_1-C_6)$-alkenyl, or $(C_1-C_6)$-alkynyl.

In another embodiment, Ar is an optionally substituted aryl group containing 6-10 carbon atoms, for example phenyl or naphthyl. In another embodiment, Ar is an optionally substituted $C_6$-aryl group, for example, phenyl. In another embodiment, the optional substituents comprise methyl, ethyl, propyl or iso-propyl.

In another embodiment, the aromatic polyamine of the formula (IX) is

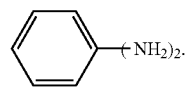

In another embodiment, the aromatic polyamine of the formula (IX) is

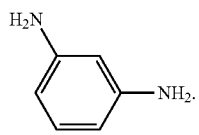

In another embodiment of the disclosure, the cycloaliphatic polyamine monomer is a monomer of the formula (X):

wherein q is 1, 2, 3 or 4,
and at least two of the carbon atoms are replaced with —NH, wherein the cycloaliphatic ring is optionally substituted by one to five of halo, $(C_1-C_6)$-alkyl, $(C_1-C_6)$-alkenyl, or $(C_1-C_6)$-alkynyl.

In another embodiment, the cycloaliphatic polyamine monomer is a $C_5$-$C_7$-cycloaliphatic ring, wherein at least two of the carbon atoms are replaced with —NH. In another embodiment, the cycloaliphatic polyamine monomer is a $C_6$-cycloaliphatic ring, wherein at least two of the carbon atoms are replaced with —NH.

In another embodiment, the cycloaliphatic polyamine monomer of formula X is:

In another embodiment of the disclosure, the aliphatic polyamine monomer comprises at least two reactive amino (—NH$_2$) moieties. In another embodiment, the aliphatic polyamine monomer is a compound of the formula (XI):

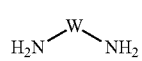

wherein W is a $(C_{2-20})$-alkylene group or a $(C_{2-20})$-alkenylene group, and wherein at least one carbon atom, optionally at least two carbon atoms, in the alkylene or alkenylene group is optionally replaced by O, S, NH or $N(C_{1-6})$alkyl moieties, suitably NH or $N(C_{1-6})$alkyl moieties. In another embodiment, W is a $(C_{4-10})$-alkylene group wherein at least one carbon atom, optionally at least two carbon atoms, in the alkylene group is optionally replaced by NH or $N(C_{1-6})$alkyl moieties. In an embodiment, the aliphatic polyamine monomer is, triethylenetetraamine, ethylenediamine, propylenediamine, or tris(2-aminoethyl)amine. In another embodiment of the disclosure, the monomer of the formula (XI) is:

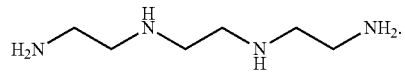

In another embodiment of the disclosure, the amine reactive polyacyl monomer is a compound of the formula (XII):

wherein m is 2, 3 or 4;
Ar is an optionally substituted aryl group containing 6-14 carbon atoms; and
X' is a leaving group, wherein the optional substituents comprise from one to five of halo, $(C_1-C_6)$-alkyl, $(C_1-C_6)$-alkenyl, or $(C_1-C_6)$-alkynyl. Examples of amine reactive polyacyl monomers include, but are not limited to, aromatic acyl halides such as trimesoyl halide, trimellitic halide, isophthaloyl halide, terephthaloyl halide, and the like.

In another embodiment, Ar is an optionally substituted aryl group containing 6-10 carbon atoms, for example phenyl or naphthyl. In another embodiment, Ar is an optionally substituted $C_6$-aryl group, for example, phenyl. In another embodiment, the optional substituents comprise methyl, ethyl, propyl or iso-propyl.

In another embodiment, the amine reactive polyacyl monomer of formula (XII) is:

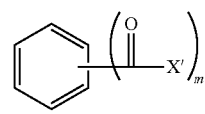

wherein m is 2 or 3; and
X' is a leaving group.

In another embodiment, the amine reactive polyacyl monomer of formula (XII) is:

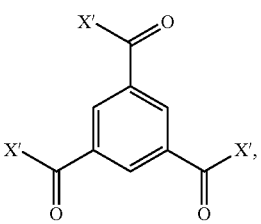

wherein X' is a leaving group.

In another embodiment, the leaving group X' is halogen, such as chloro, bromo, iodo or fluoro. In one embodiment, the leaving group, X', is chloro.

In one embodiment, membranes comprising polymers of the present disclosure are useful for the treatment of water, for example, the desalination of seawater. Accordingly, the disclosure includes methods of treating water, such as seawater, comprising filtering the water with the RO or NF membrane as described above to remove ions such as sodium, magnesium, calcium, potassium, chloride, sulphate, etc. In one embodiment, the membranes are used in applications such as water purification devices and selective separation systems for aqueous and organic liquids carrying dissolved or suspended components.

(III) Processes, Devices and Uses

The present disclosure also includes an interfacial polymerization (IP) process for preparing the polymeric matrices of the disclosure, which matrixes provide a membrane having a reduced surface negative charge and increased A value. IP processes generally proceed through the contact of an aqueous solution comprising polyamine monomers and an organic solution comprising amine reactive polyacyl monomers. At the interface of the two solutions (aqueous and organic solutions), the monomer units comprising protected amino groups are deprotected by interaction with water to form free amino monomers that react with existing matrix to form a modified polyamide polymer. In prior polyamide matrices prepared by IP, excess free carboxyl groups are formed on the surface of the polymer during or after the IP process as a result of water (from the aqueous solution) reacting with the residual amine reactive polyacyl monomers. In the present disclosure, it is one embodiment that, as a result of the addition of the monomers comprising a protected amino group in the organic solution, there is a reduction in the amount of free carboxyl groups (and therefore surface negative charge) which are formed during the IP process due to the interaction between deprotected amino groups from monomer units and residual amine reactive polyacyl monomers.

Accordingly, in one embodiment of the disclosure, there is included, an interfacial polymerization process to prepare a membrane comprising a polyamide polymeric matrix, the method comprising:

contacting a substrate with:
  an aqueous solution comprising
    (i) polyamine monomers; and
  an organic solution comprising
    (i) amine reactive polyacyl monomers; and
    (ii) monomers comprising a protected amino group,
wherein the polyamine monomers, amine reactive polyacyl monomers and the monomers comprising a protected amino group are as defined above.

In one embodiment, the substrate is first contacted with the aqueous solution and subsequently with the organic solution, or in another embodiment, the substrate is first contacted with the organic solution and then subsequently with the aqueous solution.

In another embodiment of the disclosure, the process is conducted in the presence of a non-nucleophilic base, such as, but not limited to, 4-dimethylaminopyridine (DMAP) or pyridine.

In another embodiment, the polyamine monomers are present in the aqueous solution in an amount between 1-4% (wt/wt), 1.5-2.5% (wt/wt) or about 2.0% (wt/wt). In another embodiment, the amine reactive polyacyl monomers are present in the organic solution in an amount between 0.01-0.5% (wt/wt), about 0.10-0.30% (wt/wt) or about 0.20% (wt/wt). In a further embodiment, the monomers comprising a protected amino group are present in the organic solution in an amount between 0.01-0.20% (wt/wt), about 0.03-0.10% (wt/wt) or about 0.03-0.06% (wt/wt).

The membrane may be further processed to remove residual chemicals, adjust performance, and/or to apply a protective coating. For example, post formation treatment with chlorinating agents, amine methylating agents, oxidizing agents and the like may provide performance improvements. After such optional treatment, the membrane is ready for use. The membrane may also be stored for later use.

The polymer matrices of the present disclosure may be formed into the composite membranes of the present disclosure and incorporated into filtration, separation, concentration apparatuses as well as medical devices, blood treatment devices and the like. These devices are also useful for water purification, for desalination, for industrial waste treatment, for minerals recovery such as from the mining industry, and for recovery of application solids from industrial processing. Further uses include layers or coatings upon the surface of any substrate including but not limited to a porous bead, a chromatographic material, a metal surfaces, a microdevice, a medical device, a catheter and the like. These coatings may act as lubricants, antibiotics, reservoirs, and/or filters for agents passed over the coated substrate. The coatings may also carry biological agents (e.g. antibodies, antibiotics, anti blood plasma coagulants, nucleotides, pharmaceuticals, and the like). The matrix may also be used to encapsulate and also to allow controlled release of pharmaceutical agents, diagnostic agents, cosmetics, and the like.

In an embodiment, the polymeric matrices of the present disclosure are useful in membrane technology for the treatment of water, for example, the desalination of seawater. Accordingly, the disclosure includes methods of treating water, such as seawater, comprising filtering the water with a membrane (such as an RO or NF membrane) comprising a polymeric matrix of the present disclosure supported on a substrate to remove ions such as sodium, magnesium, calcium, potassium, chloride, sulfate, etc. In another embodiment, membranes using the matrices of the present disclosure are also useful in water purification devices and selective separation systems for aqueous and organic liquids carrying dissolved or suspended components.

The disclosure also includes methods of treating water, for example the desalination of seawater, comprising passing the water through a membrane comprising a polymeric matrix of the disclosure in a reverse osmosis or nanofiltration process.

The composite membranes of the present disclosure can be used in any configuration or arrangement to achieve separation of solute from solvent. These configurations include partition, absolute filtration, chromatography, exchange and pass through concentration as well as other configurations known in the art. Although dead end filtration and chromatography configurations can be used with the composite membranes of the present invention, cross-flow filtration is optimal. Dead-end configurations call for passage of all solvent through the composite membrane and retention of solute at the filtration side of the composite membranes. The buildup of solute at the membrane surface may cause caking. In these configurations, the filtration apparatus must be periodically back flushed in order to remove cake solids or the filter discarded. Cross-flow configurations involve partial pass through of the feed liquid such that rejected solute is continually flushed away from the filtering membrane surface and passed with the retentate.

The following non-limiting examples are illustrative of the present disclosure:

EXAMPLES

The disclosure will now be described in further details by way of the following examples, wherein the temperatures are indicated in degrees centigrade and the abbreviations have the usual meaning in the art.

Experimental

Two parts by weight of m-phenylenediamine (MPD) and 6.6 parts by weight of camphorsulfonic acid/triethylamine salt, and 91.4 parts by weight water were mixed together to prepare an aqueous solution. This aqueous solution was applied to a typical porous supporting film (polysulfone on PET faber). The excess aqueous solution was removed to form a film the porous supporting film. An isopar-G solution containing about 0.2% by weight trimesoyl chloride (TMC) or a total of about 0.2% by weight of mixed monomers (TMC+protected amine monomers) was applied to the film. The excess isopar-G solution was removed, and this supporting film was held in 60° C., drying oven for 6 minutes to form a thin film on the porous supporting film. Thus a composite semipermeable RO membrane was obtained.

The composite semipermeable RO membrane produced was used to contact a permeation test in which 2000 ppm aqueous sodium chloride solution was treated as a raw water under the conditions of a temperature of 25 C, pH of 6.5 and pressure of 225 psi. As a result, the sodium chloride solution rejection and permeation flux (represented as A value) was obtained, as seen in Tables 1 and 2, and the Figure.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Fabrication of Membranes using Protected Amino Groups (VId)

(VId) Conc. (%)

OSN─⌬─NSO, COCl

| Run No | TMC Conc. (%) | COCl | A Value | NaCl Passage (%) |
|---|---|---|---|---|
| 1 | 0.18 | 0 | 4.35 ± 0.33 | 1.84 ± 1.15 |
| 2 | 0.18 | 0.03 | 5.72 ± 0.27 | 1.89 ± 1.00 |
| 3 | 0.18 | 0.04 | 5.86 ± 0.34 | 1.61 ± 0.62 |
| 4 | 0.18 | 0.06 | 7.03 ± 0.19 | 5.05 ± 0.69 |

TABLE 2

Fabrication of Membranes using Protected Amino Groups (VIe)

(VIe) Conc. (%)

ClOC─⌬─COCl, NSO

| Run No | TMC Conc. (%) | NSO | A Value | NaCl Passage (%) |
|---|---|---|---|---|
| 1 | 0.20 | 0 | 5.90 ± 0.42 | 3.84 ± 2.90 |
| 2 | 0.18 | 0.02 | 13.46 ± 0.23 | 4.32 ± 2.47 |
| 3 | 0.18 | 0.04 | 13.64 ± 0.54 | 2.89 ± 1.44 |
| 4 | 0.18 | 0.06 | 12.33 ± 0.74 | 3.86 ± 0.79 |

I claim:

1. A polymeric matrix, wherein the matrix is composed of:
   (i) amine compound residues having at least two amine moieties;
   (ii) acyl compound residues having at least two acyl moieties; and
   (iii) protected amino compound residues having
       (a) at least two amine moieties, or
       (b) at least one amine moiety and at least one acyl moiety;

wherein the protected amino compound residue is a residue of the formula (I):

(I)

wherein
   Ar is an aryl group containing 6-14 carbon atoms, n is 1, 2 or 3, wherein
       when n is 1 or 3, R is independently or simultaneously

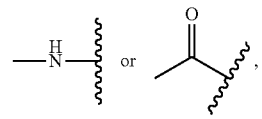

and
   when n is 2, R is

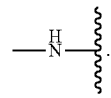

2. The matrix of claim 1, wherein at least a portion of the protected amino compound residues comprising at least one amine moiety and at least one acyl moiety comprise a self-polymerized polymer.

3. The matrix of claim 1, further comprising a substrate to form a membrane and wherein the membrane possesses an A value of at least about 5.0.

4. The matrix of claim 1, wherein the residues of the formula (I) are residues of the formula (Ia), (Ib) or (Ic):

(Ia)
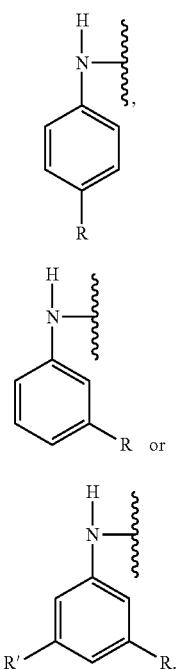

(Ib)

(Ic)

wherein R' is

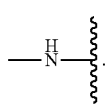

5. The matrix of claim 4, wherein the residue of the formula (Ia) is:

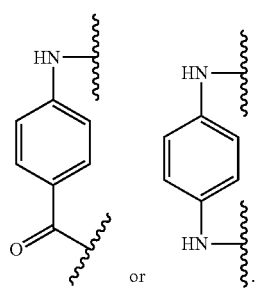 [SMILES: *Nc1ccc(C(*)=O)cc1 ; *Nc1ccc(N*)cc1]

6. The matrix of claim 4, wherein the residue of the formula (Ib) is:

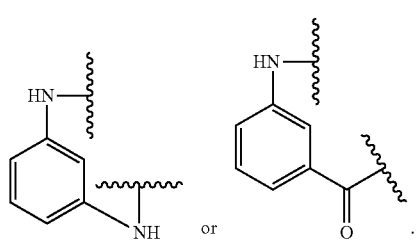 [SMILES: *Nc1cccc(N*)c1 ; *Nc1cccc(C(*)=O)c1]

7. The matrix of claim 4, wherein the residue of the formula (Ic) is:

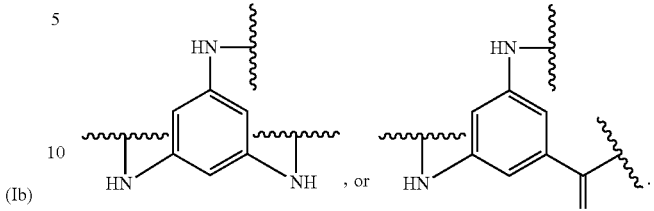

8. The matrix of claim 1, wherein the amine compound residues comprise an aromatic amine compound residue, an aliphatic amine compound residue, or a cycloaliphatic amine compound residue.

9. The matrix of claim 8, wherein the aromatic amine compound residue comprises a residue of the formula (II):

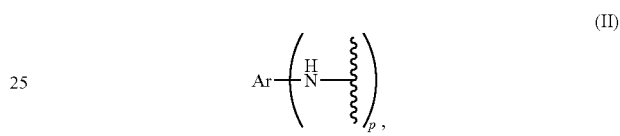
(II)

wherein Ar is an aryl group containing 6-14 carbon atoms; and
wherein p is 1, 2 or 3.

10. The matrix of claim 9, wherein the residue of the formula (II) is:

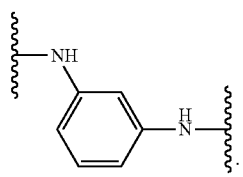 [SMILES: *Nc1cccc(N*)c1]

11. The matrix of claim 1, wherein the acyl compound residue is a residue of the formula (III):

(III)

wherein
Ar is an aryl group containing 6-14 carbon atoms;
m is 2, 3 or 4.

12. The matrix of claim 11, wherein the residue of formula (III) is:

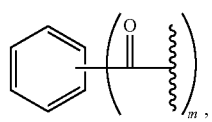

wherein m is 2 or 3.

13. The matrix of claim 12, wherein the residue of formula (III) is:

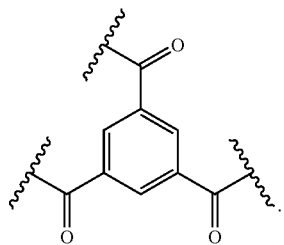 [SMILES: *C(=O)c1cc(C(*)=O)cc(C(*)=O)c1]

14. A polymeric reaction product formed from interfacial polymerization of:
 (i) polyamine monomers;
 (ii) amine reactive polyacyl monomers; and
 (iii) monomers comprising a protected amino group;
wherein the monomers comprising a protected amino group are compounds of the formula (VI):

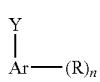
(VI)

wherein
 Ar is an aryl group containing 6-14 carbon atoms;
 Y is a protected amino group;
 n is 1, 2 or 3, wherein
  when n is 1 or 2, R is Y; and
  when n is 3, R is independently or simultaneously Y or —C(O)—X; and
 X is a leaving group.

15. The polymeric reaction product of claim 14, wherein Y is —N=S=O.

16. The polymeric reaction product of claim 14, wherein the compound of the formula (VI) is:

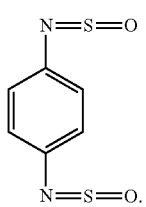

17. The polymeric reaction product of claim 14, wherein the compound of the formula (VI) is:

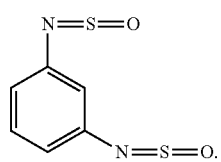 [SMILES: O=S=Nc1cccc(N=S=O)c1]

18. The polymeric reaction product of claim 14, wherein the compound of the formula (VI) is:

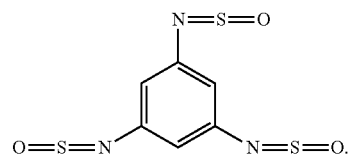 [SMILES: O=S=Nc1cc(N=S=O)cc(N=S=O)c1]

19. The polymeric reaction product of claim 14, wherein the polyamine monomers comprise at least two reactive amino (—NH$_2$) moieties.

20. The polymeric reaction product of claim 19, wherein the polyamine monomers comprise aromatic polyamine monomers, aliphatic polyamine monomers or cycloaliphatic polyamine monomers.

21. The polymeric reaction product of claim 20, wherein the aromatic polyamine monomers are compounds of the formula (IX)

(IX)

wherein Ar is an aryl group containing 6-14 carbon atoms; and
p is 1, 2 or 3.

22. The polymeric reaction product of claim 21, wherein the aromatic polyamine monomer is:

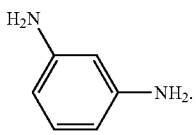

23. The polymeric reaction product of claim 14, wherein the amine reactive polyacyl monomers are compounds of the formula (XII):

(XII)

wherein
 Ar is an aryl group containing 6-14 carbon atoms;
 X' is a leaving group;
 m is 2, 3 or 4.

24. The polymeric reaction product of claim 23, wherein the amine reactive polyacyl monomer of the formula (XII) is:

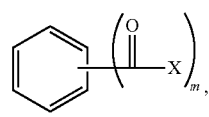

wherein m is 2 or 3; and
 X' is a leaving group.

25. The polymeric reaction product of claim 24, wherein the amine reactive polyacyl monomers is:

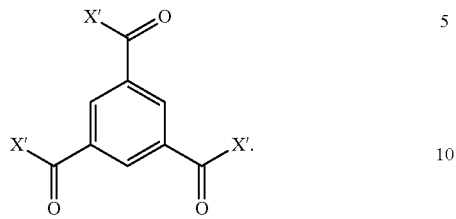

wherein X' is a leaving group.

26. The polymeric reaction product of claim 25, wherein X' is a halogen atom.

27. A combination comprising the polymeric matrix of claim 1 coated on a support material.

28. A composite membrane comprising a polymeric matrix according to claim 1 on a porous support material.

29. The composite membrane of claim 28 that is a reverse osmosis (RO) or nano-filtration (NF) membrane.

* * * * *